United States Patent
Young et al.

(10) Patent No.: US 10,209,113 B2
(45) Date of Patent: Feb. 19, 2019

(54) INTEGRATED CORIOLIS MASS FLOW METERS

(71) Applicant: Malema Engineering Corporation, Boca Raton, FL (US)

(72) Inventors: Alan M. Young, Los Gatos, CA (US); Jianren Lin, San Jose, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 0 days.

(21) Appl. No.: 15/359,310

(22) Filed: Nov. 22, 2016

(65) Prior Publication Data

US 2017/0146380 A1    May 25, 2017

Related U.S. Application Data

(60) Provisional application No. 62/259,611, filed on Nov. 24, 2015.

(51) Int. Cl.
| | |
|---|---|
| *G01F 1/84* | (2006.01) |
| *G01F 15/00* | (2006.01) |
| *G01F 15/14* | (2006.01) |
| *G01F 15/18* | (2006.01) |

(52) U.S. Cl.
CPC .......... *G01F 1/8477* (2013.01); *G01F 1/8409* (2013.01); *G01F 1/849* (2013.01); *G01F 1/8413* (2013.01); *G01F 1/8472* (2013.01); *G01F 15/006* (2013.01); *G01F 15/14* (2013.01); *G01F 15/18* (2013.01)

(58) Field of Classification Search
CPC ..................................... G01F 1/84; G01F 1/76
See application file for complete search history.

(56) References Cited

U.S. PATENT DOCUMENTS

| | | | | |
|---|---|---|---|---|
| 4,252,028 A | * | 2/1981 | Smith | G01F 1/8477 73/861.355 |
| 4,491,025 A | * | 1/1985 | Smith | G01F 1/8477 73/861.355 |
| 4,768,385 A | | 9/1988 | Cage | |
| 5,038,620 A | * | 8/1991 | Rogers, Jr. | G01F 1/8413 250/227.16 |
| 6,450,042 B1 | | 9/2002 | Lanham et al. | |
| 6,776,053 B2 | | 8/2004 | Schlosser et al. | |
| 6,904,667 B2 | | 6/2005 | Lanham et al. | |
| 7,127,815 B2 | | 10/2006 | Schlosser et al. | |

(Continued)

FOREIGN PATENT DOCUMENTS

TW            201518692 A      5/2015

OTHER PUBLICATIONS

PCT International Search Report and Written Opinion, PCT Application No. PCT/US16/63398, Feb. 15, 2017, 14 pages.

(Continued)

*Primary Examiner* — Jewel V Dowtin

(74) *Attorney, Agent, or Firm* — Fenwick & West LLP

(57) ABSTRACT

An integrated flow meter includes a support and one or more flow sensitive member(s) integrated with the support. The support is formed by using an injection molding process that overmolds material over an outer surface of the flow sensitive member(s). The materials for the support and for the flow sensitive member(s) preferably are polymeric materials.

21 Claims, 13 Drawing Sheets

(56) References Cited

U.S. PATENT DOCUMENTS

| | | | |
|---|---|---|---|
| 7,716,995 B2* | 5/2010 | Patten | G01F 1/8413 |
| | | | 73/861.355 |
| 8,404,076 B2 | 3/2013 | Young et al. | |
| 8,887,578 B2* | 11/2014 | Young | B29C 67/004 |
| | | | 73/861.354 |
| 2002/0139199 A1 | 10/2002 | Lanham et al. | |
| 2003/0097882 A1 | 5/2003 | Schlosser et al. | |
| 2013/0174670 A1 | 7/2013 | Young et al. | |
| 2014/0174561 A1 | 6/2014 | Hagihara et al. | |
| 2015/0053021 A1 | 2/2015 | Young | |

OTHER PUBLICATIONS

Taiwan Office Action, Taiwan Application No. 105138710, Aug. 2, 2017, 10 pages.
Taiwan Office Action, Taiwan Application No. 105138710, May 17, 2018, 10 pages.

\* cited by examiner

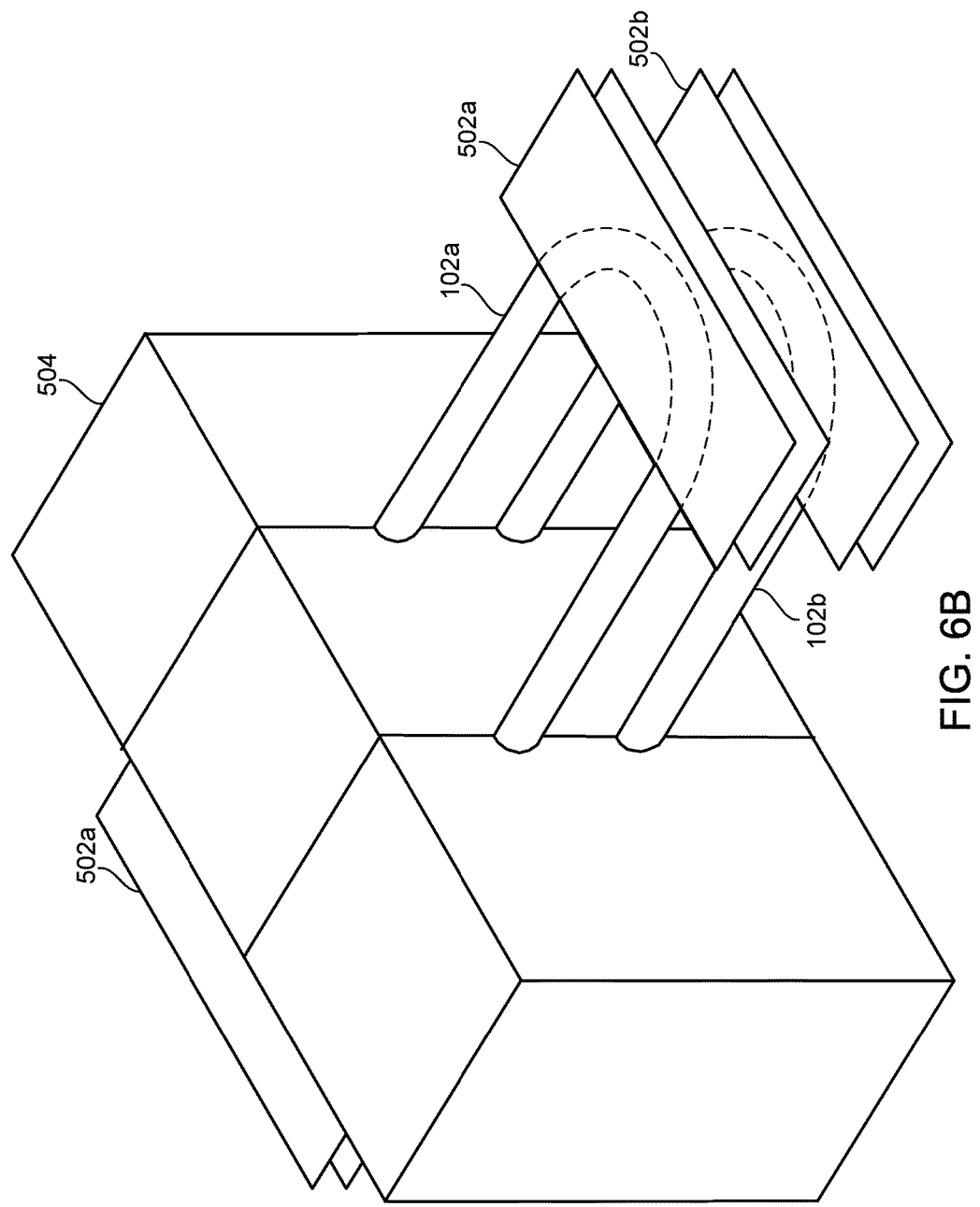

INTEGRATED CORIOLIS MASS FLOW METERS

CROSS-REFERENCE TO RELATED APPLICATION

This application claims the benefit of U.S. Provisional Application Ser. No. 62/259,611, entitled "Method of Manufacturing a Weld-Less Coriolis Mass Flow Rate Sensor from a Polymeric Material," filed on Nov. 24, 2015, which is incorporated by reference herein in its entirety.

BACKGROUND

1. Technical Field

The present disclosure relates generally to Coriolis mass flow meters, and more specifically to integrated Coriolis mass flow meters in which flow sensitive member(s) and support structure are integrated, and also to methods of manufacturing such Coriolis mass flow meters.

2. Background Information

Coriolis mass flow meters (also referred herein as "flow meters") measure a mass flow rate of a fluid flowing through a tube based on Coriolis principles. Typical configurations employ one or two tubes through which the fluid flows and which are oscillated in a controlled manner. Coriolis induced deflections or the effects of such deflections on the tube(s) are measured to calculate the fluid mass flow rate of the fluid flowing through the sensor. Additionally, fluid density can also be measured (independently of mass flow rate) by measuring the change in the sensor's resonant frequency versus fluid density.

Some traditional flow meters use metal alloy flow tubes as the flow sensitive elements. Some traditional methods attach Perfluoroalkoxy alkanes (PFAs) tubular flow sensitive elements to metal supports using an adhesive. However, continuous vibration of the flow sensitive elements causes the adhesive joints to degrade overtime thereby deteriorating the integrity of these traditional flow meters. Additionally, different discrete components of these flow meters are usually made of different materials having different thermal expansion properties. The coupling between the flow sensitive elements and support loses its integrity which results in uncontrolled vibrations and comprises the performance of these devices.

Some traditional methods of manufacturing flow meters that employ etching require submersing and gently agitating tubes in a heated bath containing glycol-diether. While adding costs and complexity to the fabrication of devices, this etching process may not necessarily yield tubes that are suitable for flow meter fabrication on a consistent basis.

Some traditional methods fabricate flow meters via injection molding and form the flow path from a core mold. The core mold is typically made from a low-melting point fusible metal alloy containing a mixture of bismuth, lead, tin, cadmium, and indium with a melting point of about 117 degrees Fahrenheit. When fabricating the flow sensitive members, hot plastic is injected into a mold at temperatures that can exceed 350 degrees Fahrenheit at pressures exceeding 5000 psi. This may impair the comparatively narrow and flexible fusible metal core. As a result, the flow sensitive members are likely to be deformed thereby rendering the device itself unusable. Moreover, metal atoms are likely to mix with and to become embedded within the injected plastic thereby permanently contaminating the flow sensitive members. This can render the device unsuitable for applications that require high-purity processes, such as semiconductor, pharmaceutical or bio-pharmaceutical applications. Moreover, different components of the flow meters fabricated by the traditional injection molding process must all have a similar thickness which is likely to cause structural and/or dynamic design limitations or compromises that could adversely affect and/or limit the performance of the flow meters.

Some traditional fabrication processes employ secondary operations to manufacture the fluid passageways. For example, some processes drill fluid passageways through an entire structure machined from a single piece of polymeric material. Alternatively, some methods form the flow passageways by a combination of a solid core employed within a mold and/or secondary drilling operations after the part is removed from its mold. External holes from coring or drilling are filled by welding or other suitable procedures. Forming the flow passageways with solid cores within a mold and/or drilling may necessarily require the fluid passageways to have larger wall thickness, which can limit these devices' flexibility and measurement sensitivity at low flow rates.

Further traditional methods weld flow sensitive elements onto supports to manufacture flow meters. The flow sensitive elements and supports are typically fabricated from the same polymeric material. However, these supports typically include considerable polymeric material and increase costs of the materials used. Also, application limitations require several internal diameters to change which may cause slurry solids and/or entrained gas/bubbles to accumulate. Further, variations in tube-to-support welding process can introduce dimensional differences and stiffness variations of the flow sensitive element(s) extending from a support, causing the two halves of the flow meter not to vibrate as designed. Last, the welding joint can adversely affect the boundary conditions of the flow sensitive element(s).

SUMMARY

Embodiments of the present disclosure include integrated Coriolis mass flow meters and methods of manufacturing these integrated Coriolis mass flow meters. An integrated flow meter includes a support and one or more flow sensitive member(s) integrated with the support. The one or one flow sensitive member(s) are securely affixed to and extend through the support. Portions of the one or more flow sensitive member(s) that extend from the front of the support are configured to vibrate. The flow sensitive element(s) are, in some examples, fabricated from polymeric tubes with comparatively thin walls (e.g., less than or equal to 1 mm). As a result, the flow meters as described herein have improved flow and density measurement sensitivity, even at low fluid flow rates. Since the fluid path is comprised of the flow sensitive members only and there is no dimension (e.g., diameter) change along the fluid path, the flow meters as described herein provide accurate measurements.

The support provides structural support of the flow meter. The support clamps the flow sensitive member(s). The support is formed employing an injection molding process that overmolds the support material over an outer surface of the flow sensitive member(s). A tooling may be used to hold the flow sensitive member(s) in place during the injection molding process. Metal rods may be inserted into the flow sensitive member(s) to prevent the flow sensitive members from deforming cross-sectionally. The materials for the support and for the flow sensitive members(s) preferably are polymeric materials. The risk of metal contamination is removed and flow meters as described herein can be made suitable for high-purity applications.

The support may include integrated features such as one or more port extensions and isolation plates connecting adjacent port extensions. The isolation plates establish the boundary conditions of vibration of the flow sensitive members. The flow sensitive member(s) are fabricated from a first material having a first coefficient of thermal expansion ("CTE.") The support is fabricated by over-molding a second material having a second CTE over an outer surface of the flow sensitive member(s). The second CTE is substantially close to or smaller than the first CTE. Even when temperature changes, the support remains clamping the flow sensitive member(s) to maintain their relative positions. The second material may also have a stiffness (i.e., rigidity or elastic modulus) that exceeds that of the first material and/or a smaller dampening coefficient than that of the first material. Since the flow sensitive members are integrated with the support without any joints such as welding or adhesive joints, the integrity and reliability of the flow meters is ensured. Accordingly, the flow meters as described herein have improved reliability compared to conventional flow meters.

BRIEF DESCRIPTION OF THE DRAWINGS

FIGS. 6A and 6B illustrate example processes of manufacturing an integrated Coriolis mass flow meter, according to additional embodiments.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Example Coriolis Mass Flow Meters

Figure 1A:
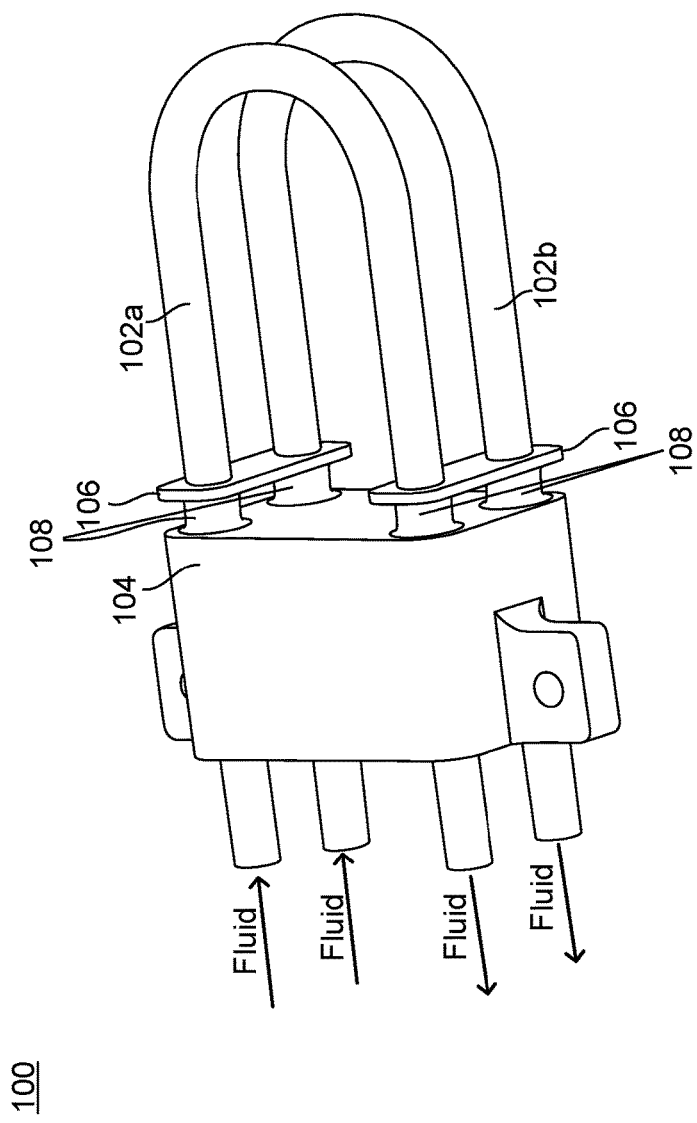
FIGS. 1A and 1B illustrate a side perspective view and a rear perspective view of an example integrated Coriolis mass flow meter, according to one embodiment.
Figure 1B:
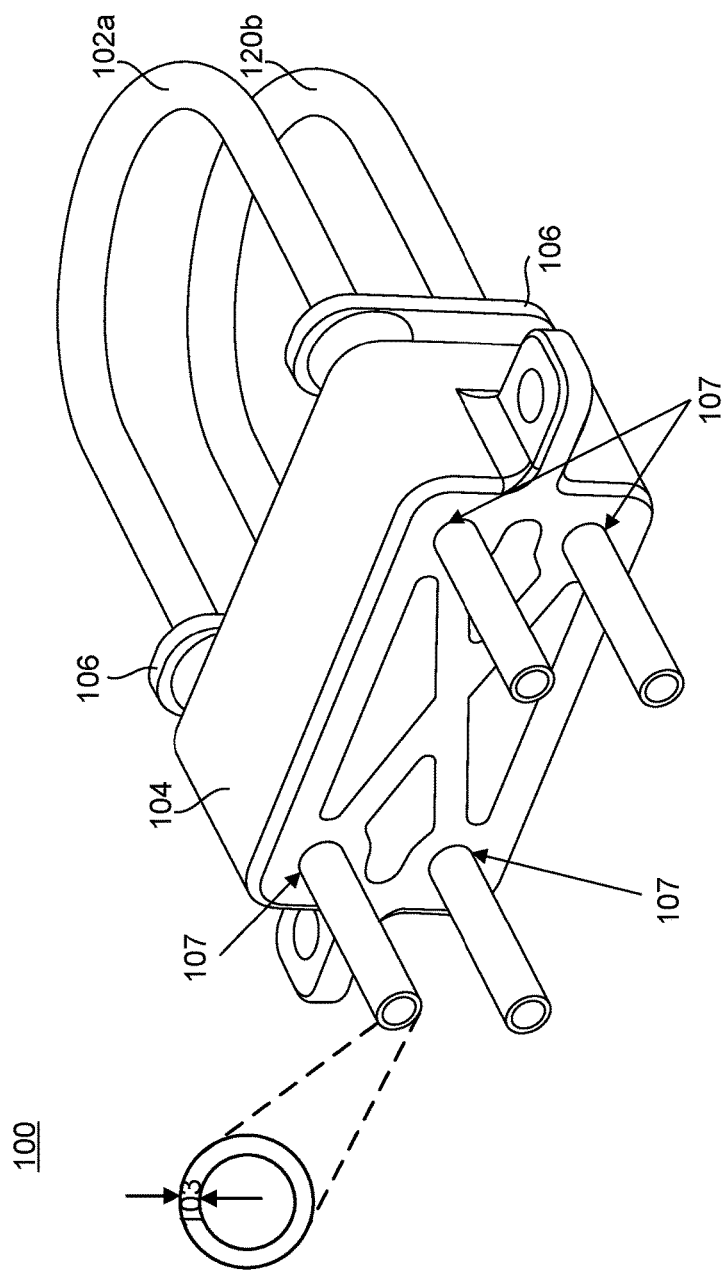

FIGS. 1A and 1B illustrate side and rear perspective views of an example Coriolis mass flow meter 100, according to one embodiment. The Coriolis mass flow meter (also referred herein as "flow meter") 100 may be manufactured according to the method as described further below with reference to FIGS. 5A through 6. The flow meter 100 includes flow sensitive members 102a-b and a dynamically responsive support (also referred herein as "support") 104 that holds the flow sensitive members 102a-b. The flow sensitive members 102-b are hollow and have tubular cross sections to allow fluid to flow through them. In the illustrated example, the flow sensitive members 102a-b each have curvilinear shapes and are identical. In this example, they are U-shaped with straight tubular legs that are held by the support. One advantage of using curvilinear shaped flow sensitive members is that there are no corners so there are no abrupt changes in direction along the fluid path. Accordingly, possible accumulation of slurry solids inside the flow sensitive members that may cause increased pressure drop or cause the flow sensitive members to dislodge from the support thus creating particle contamination is eliminated.

The flow sensitive members 102a-b are made of a first material having a first coefficient of thermal expansion ("CTE"). In various embodiments, the flow sensitive members 102a-b are made of a polymeric material that may be commercially available or custom fabricated. Example polymeric materials include, but are not limited to, Perfluoroalkoxy alkanes (PFAs), Polyetheretherketone (PEEK), polyvinylidene difluoride (PVDF), Polytetrafluoroethylene (PTFE), and Fluorinated ethylene propylene (FEP.) The flow sensitive members 102a-b preferably are tubes with comparatively thin walls. A thickness 103 of a wall of each flow sensitive member 102a or 102b is less than a predetermined threshold (e.g., less than 1 mm.) Flow sensitive members with comparatively thin walls are more flexible. Accordingly, flow meters that use flow sensitive members with thin walls have improved flow and density measurement sensitivity, even at low fluid flow rates.

Figure 2:
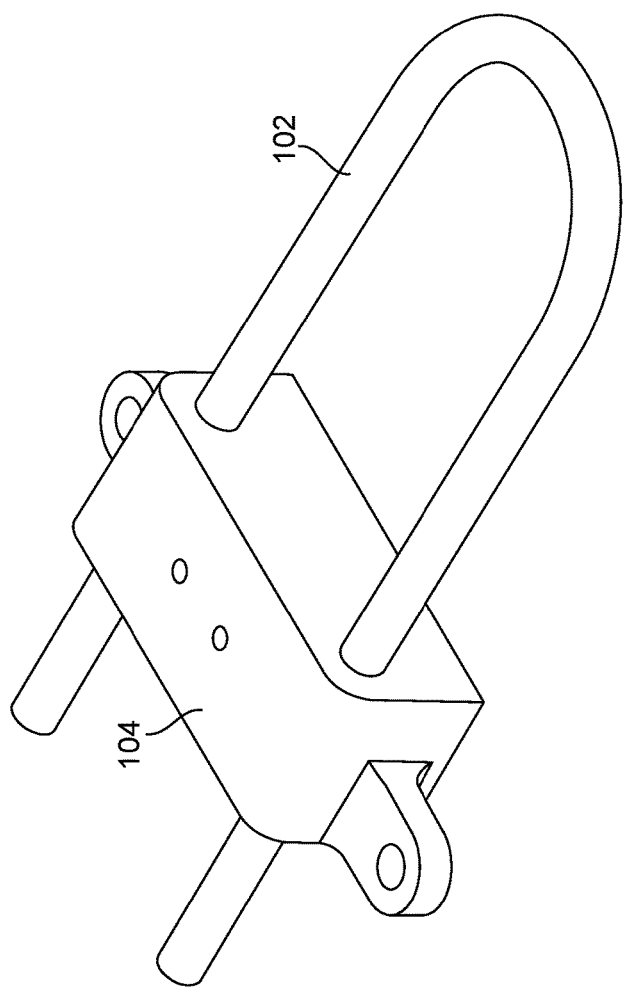
FIG. 2 illustrates a front perspective view of an example integrated Coriolis mass flow meter, according to another embodiment.

Other embodiments may include flow sensitive members shaped in other forms such as a square or rectangular form 402, a triangular form 404, an elliptic form 406, and a straight form 408, as illustrated in FIGS. 4A through 4D, respectively. The flow meter can include any number of flow sensitive members. For example, the example flow meter 200 as illustrated in FIG. 2 includes only one "U"-shaped tubular flow sensitive member 102.

In FIG. 1, the flow sensitive members 102a-b are integral components constructed of a single material and are also integrated with the support 104. The flow sensitive members 102a-b have parallel tubular legs, which are affixed to and extend through the support 104. Specifically, for each flow sensitive member, a segment of each straight leg section is affixed to the support 104, and the curve section and the rest of the straight leg section extend from the support 104. Portions of the flow sensitive members 102a-b that extend from the front end of the support 104 are configured to vibrate. Fluid material is directed to portions of the flow sensitive members 102a-b that extend from the rear end of the support 104. As illustrated, the fluid materials flow through the flow sensitive members in a hydraulically parallel manner. Alternatively, the fluid materials can flow through the flow sensitive members in a hydraulically serial manner.

Example Dynamically Responsive Support

Figure 3A:
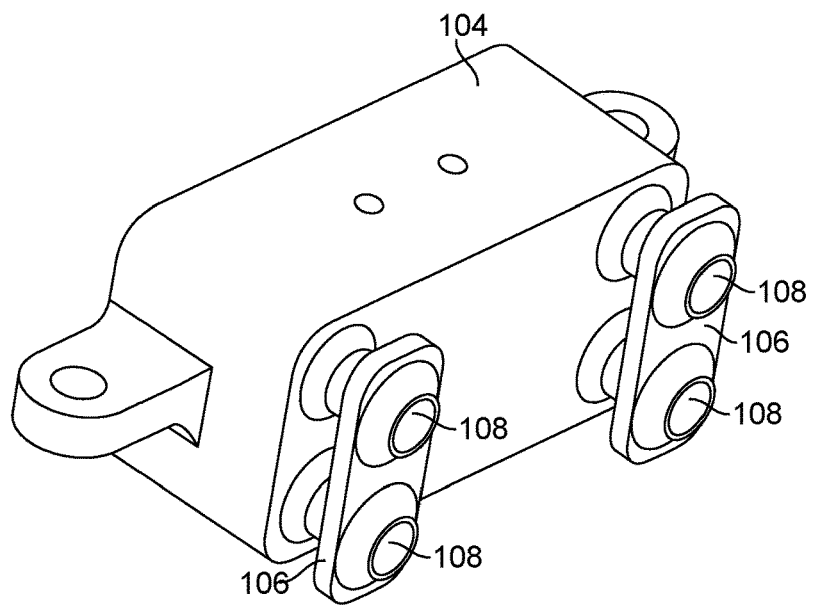
FIG. 3A illustrates a front perspective view of a support with additional integrated features, according to one embodiment.
Figure 3B:
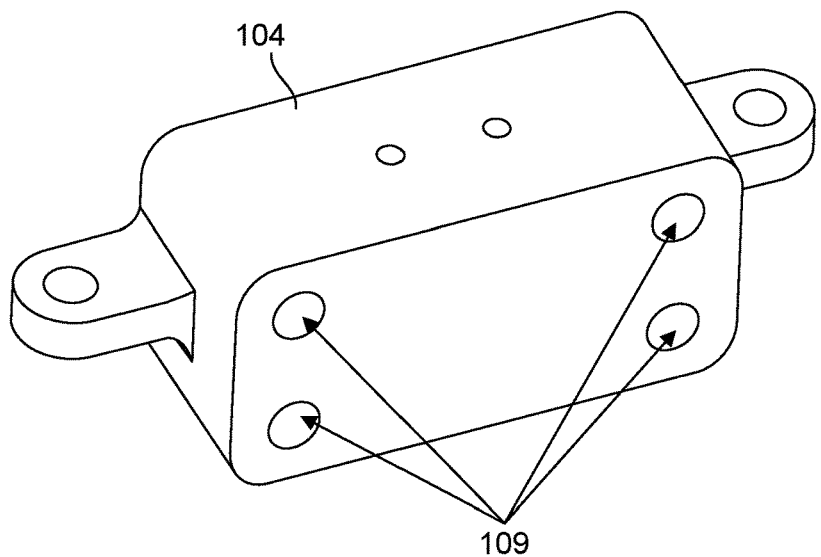
FIG. 3B illustrates a front perspective view of a support without the additional integrated features of FIG. 3A, according to one embodiment.
Figure 4C:
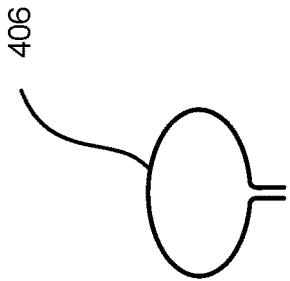
FIGS. 4A through 4D illustrate plan views of example flow sensitive members having different shapes, according to various embodiments.
Figure 4B:
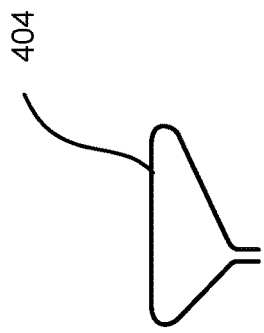
Figure 4A:
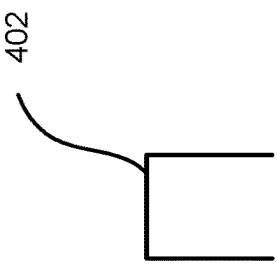
Figure 4D:
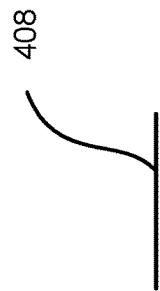

The support 104 provides structural support for the flow meter 100. The support 104 holds the flow sensitive members 102a-b and is integrated with the flow sensitive members 102a-b. In the over-molding manufacturing method described below, the support 104 is integrated with the flow sensitive members 102a-b such that it clamps the outer surface of the two legs of each flow sensitive members 102a-b, but without the use of a separate adhesive. The support 104 is made of a second material having a second CTE. The support 104 is fabricated by using an overmolding process that molds the second material over the legs of the flow sensitive members. The support 104 therefore is constructed from a single monolithic piece of the second material. The support 104 includes tubular channels through which the flow sensitive members 102a-b extend. The support 104 further includes ports on the front and rear ends that allow the flow sensitive members 102a-b to pass through. For example, as illustrated in FIG. 1B, the rear end of the support 104 includes ports 107. As illustrated in FIG. 3B, the front end of the support 104 includes ports 109.

The support 104 clamps the flow sensitive members 102a-b. Because the second CTE of the second material is substantially close to or smaller than the first CTE of the first material, when temperature increases, the support 104 expands at a slower rate than the flow sensitive members 102a-b and maintains clamping force on the flow sensitive members 102a-b. The clamping force is maintained even when temperature drops. The second material preferably is also a polymeric material that may be the same as or different from the first material. In one embodiment, the second material is glass filled polycarbonate. As described herein, substantially close to refers to the difference between the first and second CTE is within a predefined tolerance that would be acceptable to those skilled in art. In various embodiments, the predefined tolerance can be, for example, a 1% tolerance, a 2% tolerance, a 5% tolerance, etc. Some of the lines in the illustrated figures are artifacts of the drawing software or included to facilitate illustration and do not represent joints between discrete components—the support 104 in all of the figures is a single integral component. In some embodiments, the second material has a stiffness (i.e., rigidity or elastic modulus) that exceeds that of the first material. The second material also has a smaller dampening coefficient than that of the first material. This is to ensure that a support provides a more unyielding and constant boundary condition for terminating the vibration of the tubular flow sensitive member(s).

The support 104 may also include additional integrated features affecting dynamic response characteristics of the flow meter 100. For example, the front end of the support 104 includes one or more integrated port extensions 108 that clamp the two legs of each flow sensitive members 102a-b. The front end of the support 104 further includes isolation plates 106 that connect adjacent port extensions 108. The isolation plates 106 are integrated with the port extensions 108, both of which are integrated with the support 104. An inner surface of each port extension 108 contacts the outer surface of the leg of a corresponding flow sensitive member. In some embodiments, the outer surface of the leg of the flow sensitive members that is clamped by the support 104 including the port extensions 108 is roughened. The isolation plates 106 establish the boundary conditions of vibration of the flow sensitive members 102a-b. The flow sensitive members 102a-b can vibrate in opposite phases (i.e., "anti-phase") similar to a tuning fork, or vibrate together in unison (i.e., symmetrically "in-phase"). The isolation plates 106 exert a major influence on the flow meter's dynamic frequency response characteristics. Depending on the rigidity of the mounting of the support 104 as well as the material and dimensions of the flow sensitive members 102a-b, the natural frequency of the in-phase vibration can be close (if not identical) to that of the anti-phase vibration. When the two frequencies are closer to each other, the instability risk of the flow meter 100 also increases, because vibrational excitation energy will be shared uncontrollably between the two vibrational modes. Thus, it is important to sufficiently separate the natural frequencies to prevent malfunction of the flow meter 100. The isolation plates 106 serve this purpose. The isolation plates 106 cause different segments of the flow sensitive elements 102a-b to vibrate in the in-phase and anti-phase modes and create well defined vibrational boundary conditions that separate the two frequencies. The dimensions and thickness of the isolation plates 106 can be configured according to the frequency response characteristics of the flow meter 100. Front perspective views of a support 104 with and without the integrated features are illustrated in FIGS. 3A and 3B. Again, note that some of the lines in the illustrated figures are artifacts of the drawing software or included to facilitate illustration. For example, in FIG. 3A, the main body of the support 104, the port extensions 108 and the isolation plates 106 are not separate components that are then assembled. Rather, they are formed as one integral piece, such as by molding described below.

FIGS. 4A through 4D illustrate plan views of example flow sensitive members having different shapes, according to various embodiments. The illustrated example flow sensitive members 402, 404, 406, and 408 are all hollow and allow fluid to flow through them. The flow sensitive members 402, 404, 406, and 408 each may include tubular cross sections. A support similar to the support 104 as described previously with respect to FIGS. 1A through 3B can be molded over an outer surface of the two end legs of flow sensitive member 402, 404, or 406 to manufacture a flow meter that is similar to the flow meters as illustrated in FIGS. 1A through 2. Similarly, a structurally similar support can be molded over the flow sensitive member 408 where both ends of the flow sensitive member 408 extend from the support of which both the front and rear ends include isolation plates. Alternatively, two supports can be molded over the flow sensitive member 408: one support is molded on one end of the flow sensitive member 408 and the other support is molded on the other end of the flow sensitive member 408.

Example Process of Manufacturing a Flow Meter

Figure 5A:
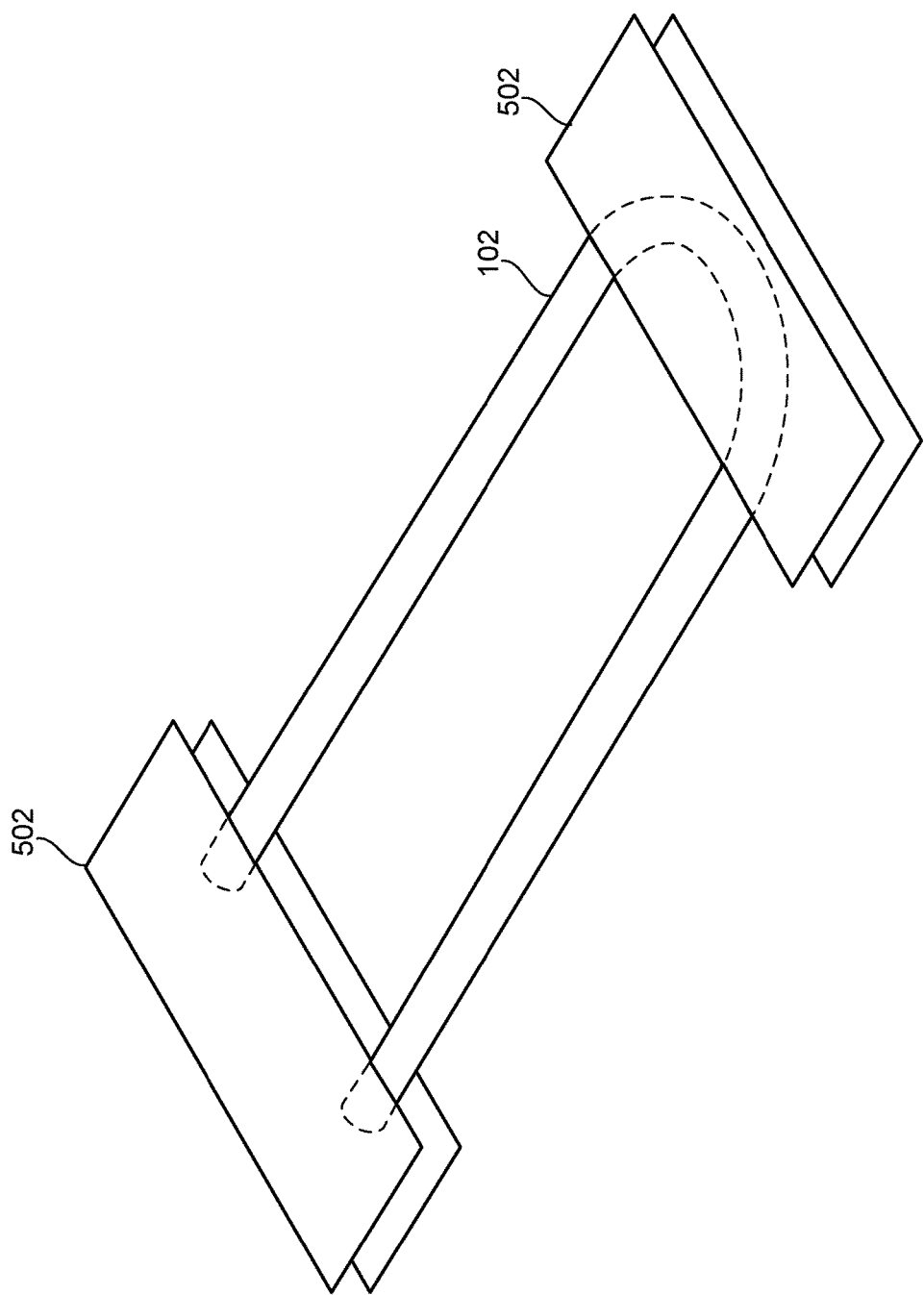
FIGS. 5A through 5D illustrate an example process of manufacturing an integrated Coriolis mass flow meter, according to one embodiment.

FIGS. 5A through 5D illustrate perspective views of a manufacturing process in which a support 104 is over-molded over a flow sensitive member 102, thus forming the integrated Coriolis mass flow meter, according to one embodiment. FIG. 5E is a flow chart illustrating a corresponding manufacturing process. As illustrated in FIG. 5A, a tooling 502 holds 550 the flow sensitive member 102b in place during the over-molding process. In this example, the tooling 502 includes two pieces, one of which holds the ends of the two legs of the flow sensitive member 102 and one of which holds the U-bend of the flow sensitive member 102. Other types of tooling will be apparent.

Figure 5B:
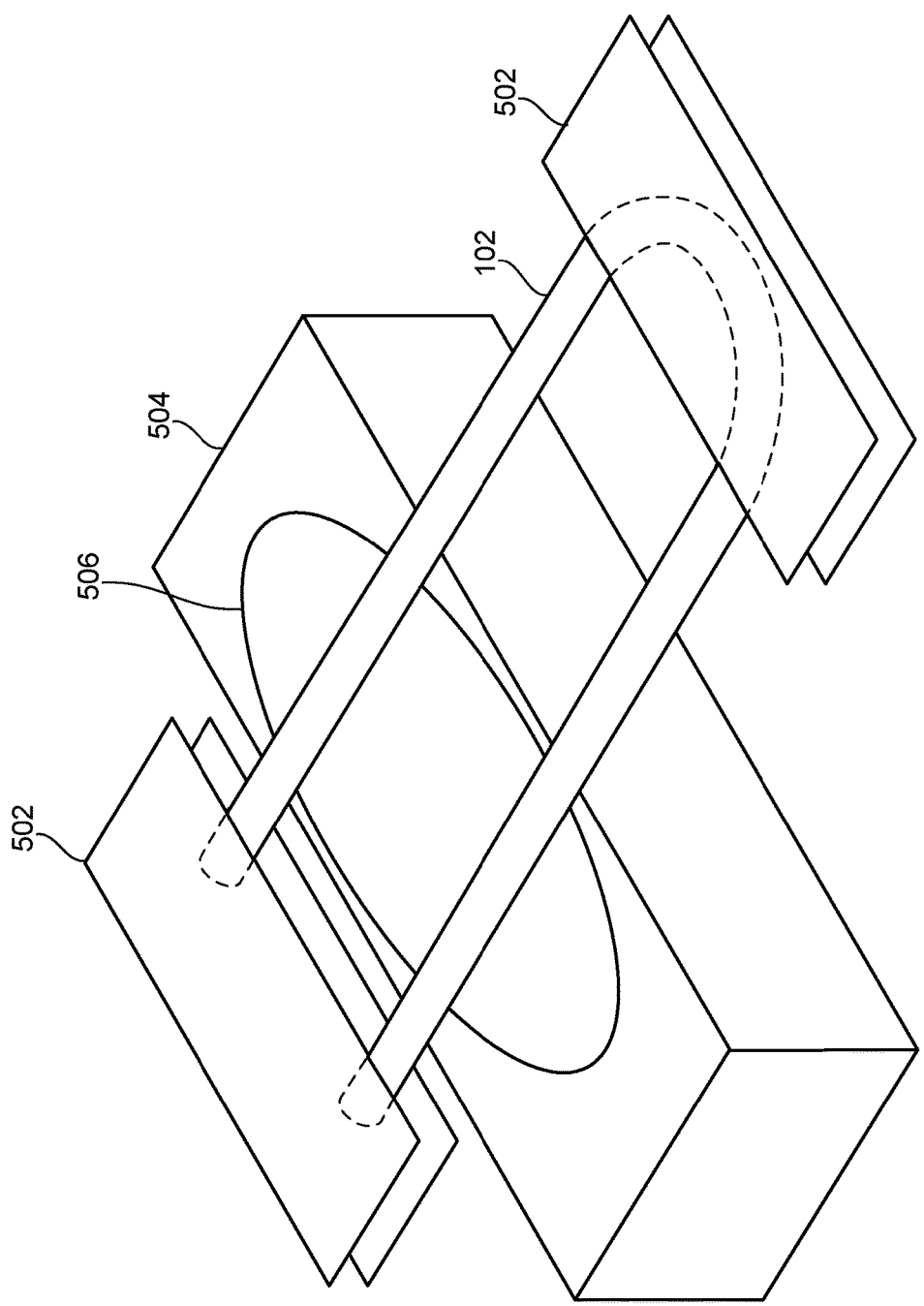
Figure 5C:
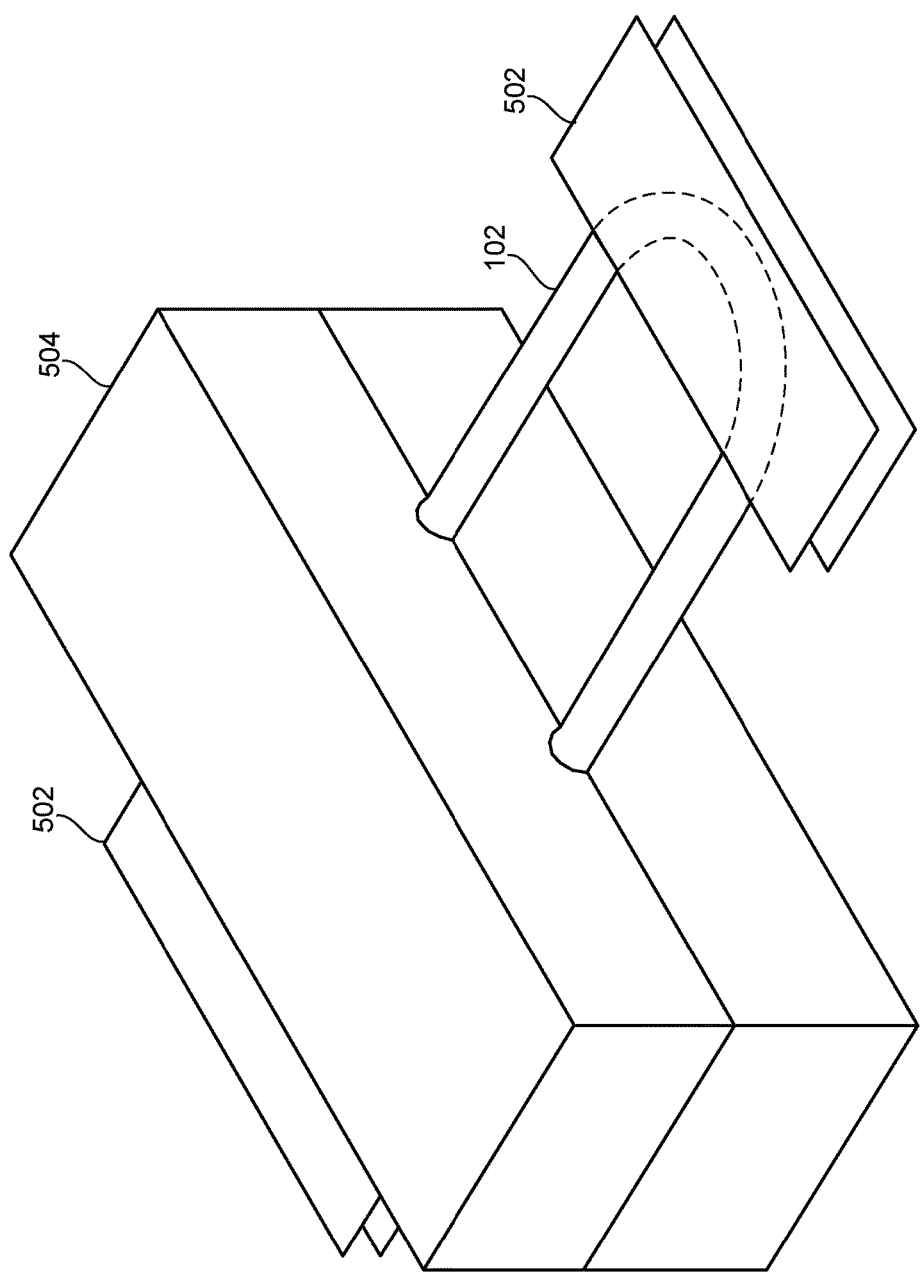

FIGS. 5B and 5C show closing 552 of a two-piece mold 504 over the flow sensitive member 102. FIG. 5B shows only the bottom piece of the mold 504, so that the cavity 506 for forming the support 104 can be seen. For convenience, the cavity 506 is shown as a blob rather than as the actual complicated shape. In FIG. 5C, the mold 504 is closed, with both pieces of the mold surrounding the two legs of the flow sensitive member 102. In some embodiments, an outer surface of the flow sensitive members has a roughened finish, for example, at least partially in the segment that is to be surrounded by the support. The outer surface may be roughened from a tube extrusion process. The tooling 502 holds the flow sensitive member 102 while the support 104 is being over-molded over the legs of the flow sensitive member 102.

An injection molding process is used to fabricate the support 104. Material for the support is injected 554 into the mold 504 at a temperature that is lower than the glass transition temperature of the material of the flow sensitive member 102. The material is melted and injected at a temperature that is higher than that of the flow sensitive member 102. As the injected material cools 556, the support is over-molded over the legs of the flow sensitive member. The tubular channels in the support shrink during cooling, thus clamping onto the tubular legs of the flow sensitive member. When the material for the support 104 is the same as the material of the flow sensitive member 102, the cohesive bonds formed between the support 104 and the flow sensitive member strengthen the clamping force. In some embodiments, when molding the support 104 onto the outer surface of the flow sensitive member 102, rods may be inserted into the flow sensitive member 102 to prevent the flow sensitive member 102 from deforming and to ensure that the cross-section remains tubular. This is because the flow sensitive member 102 is subject to a force along the cross-sectional direction when the support 104 is being molded over the flow sensitive member 102 such that the support 104 tightly grips the flow sensitive member 102.

Figure 5D:
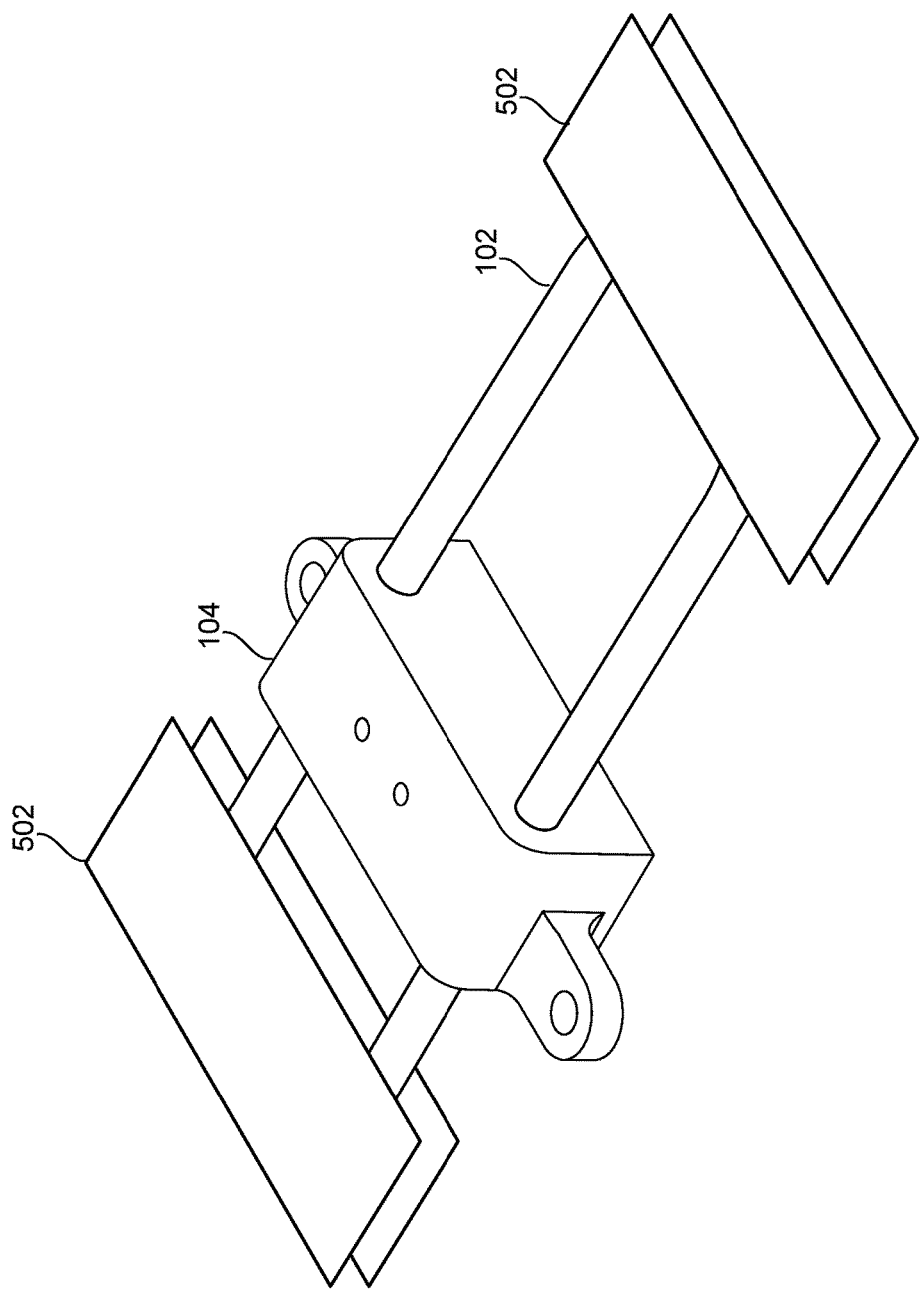
Figure 5E:
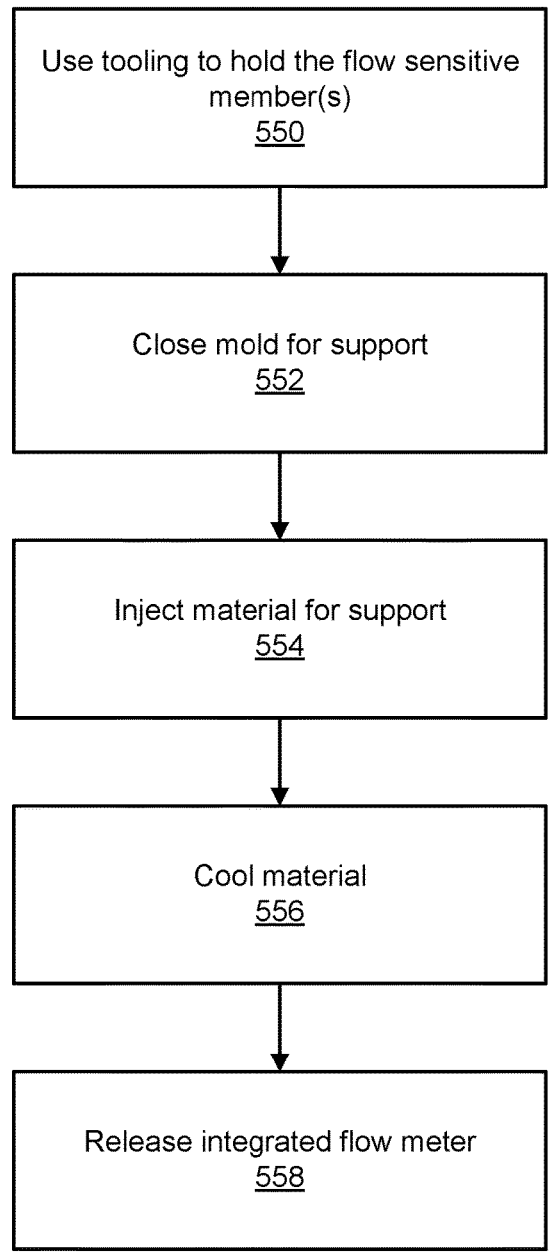
FIG. 5E is a flow chart illustrating an example process of manufacturing a Coriolis mass flow meter, according to one embodiment.

In FIG. 5D, the mold 504 has been opened, releasing 558 the integrated Coriolis mass flow meter. Compared to conventional flow meters that include physically discrete isolation plates attached to the tubes, integrated flow meters as described herein include supports that are structurally integrated with isolation plates. One benefit is simpler manufacturing. In addition, manufacturing methods as described herein ensure a more unyielding and constant boundary condition for terminating the vibration of the tubular flow sensitive element(s) regardless of tube shape. Fabricating an integrated flow meter as described herein also allows for greater design flexibility (e.g., thickness and separation of isolation plates) permitting a support to be molded onto a variety of tube shapes without separately attaching the isolation plates to the tubes.

Figure 6A:
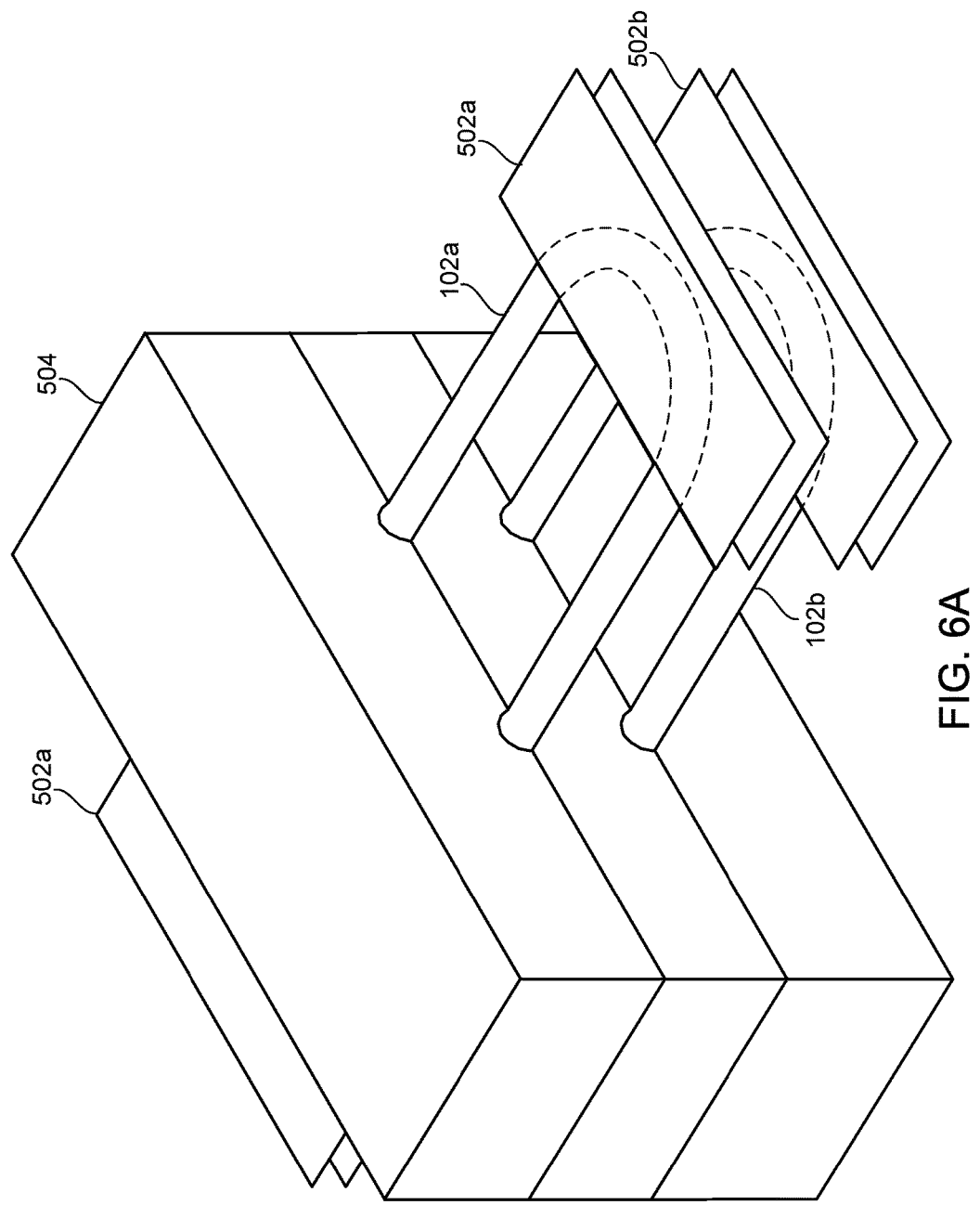

The example of FIGS. 5A through 5E showed a single flow sensitive member. However, the same approach can be used with multiple flow sensitive members. FIGS. 6A and 6B are counterparts to FIG. 5C, but for a Coriolis mass flow meter with two flow sensitive members. In this case, a different model (e.g., a three-piece mold) is used. In FIG. 6A, the three pieces are oriented in one direction relative to the flow sensitive members. In FIG. 6B, they are oriented in the perpendicular direction relative to the flow sensitive members.

Example Coriolis Mass Flow Meter Assembly

Figure 7:
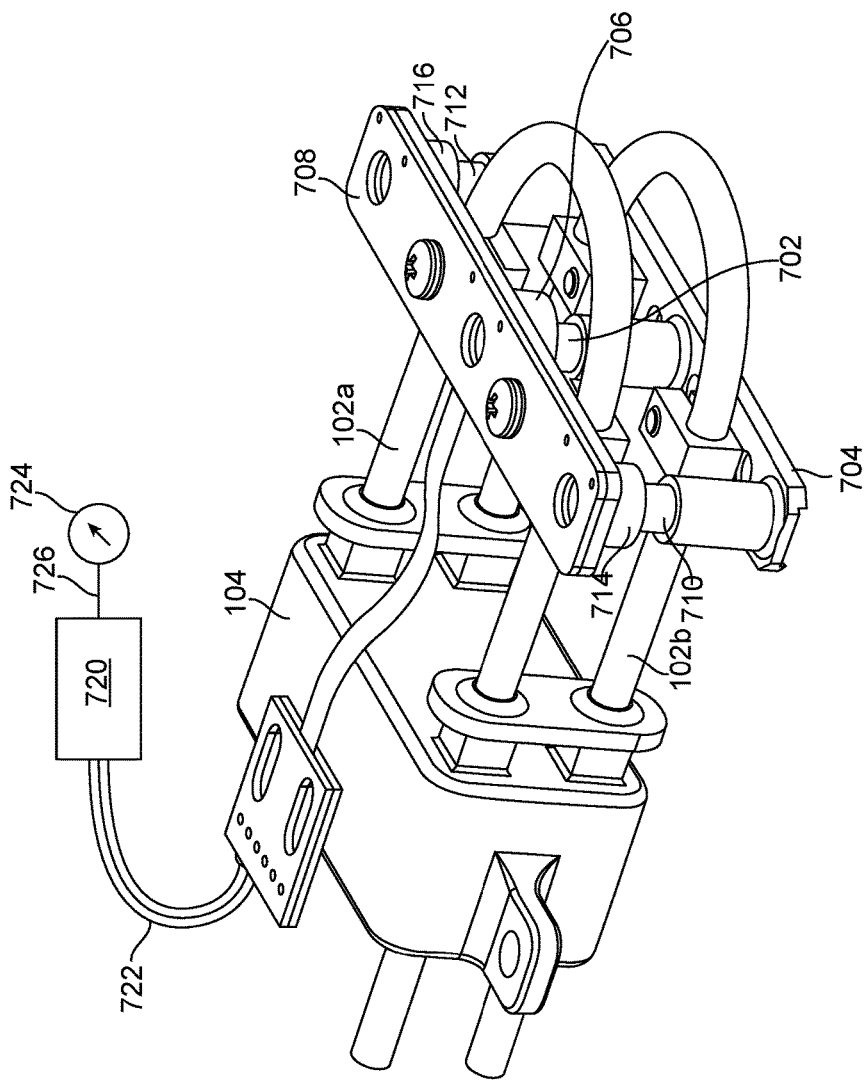
FIG. 7 illustrates an example integrated Coriolis mass flow meter assembly, according to one embodiment.

FIG. 7 illustrates an integrated Coriolis mass flow meter assembly 700, according to one embodiment. The flow meter 100 is driven by an electromagnetic driver assembly. The electromagnetic driver includes a magnet 702 mounted to a cross-member 704 and a coil 706 mounted to a cross-member 708. The cross-members 704, 708 are attached to the flow sensitive members 102a, 102b of the flow meter 100, respectively. When a suitable sinusoidal signal is applied to the coil 706, the flow sensitive members 102a and 102b are driven to vibrate the opposition-phase mode.

Motion sensors (also known as inductive "pick-offs" or "velocity sensors") comprising magnet/coil-pairs 710, 714, and 712, 716 located on opposite sides of the flow sensitive members 102a, 102b detect the Coriolis forces generated by fluid flowing through the flow sensitive members 102a, 102b. Motion of the flow sensitive members 102a and 102b is inductively generated in coils 714, 716 that are mounted to the cross-member 708. The coils 714, 716 are part of the motion responsive magnet-coil pairs that include corresponding magnets 710, 712 that are mounted to the cross-member 704. In cases of flow meters that include only one vibrating flow sensitive member, magnets can be attached to the flow sensitive member directly and coils can be attached to a solidly mounted platform (not shown).

When detecting the motion generated in the flow sensitive members 102a, 102b as a result of the impressed excitation motion, the motion sensors output signals representing contribution from the mass flow induced Coriolis forces. The output signals from these motion sensors are transmitted to the meter electronics 720, for example, via a transmission circuit 722. The meter electronics 720 processes the received signals and outputs information indicative of the fluid material mass flow rate to the display 724, for example, via a signal path 526. Other types of motion sensors such as optical sensors can also be used.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An integrated Coriolis mass flow meter, comprising:
a flow sensitive member, the flow sensitive member having two tubular legs; and
a support over-molded over the flow sensitive member, wherein a stiffness of the support exceeds a stiffness of the tubular legs, each of the tubular legs extends through the support, and the support clamps each of the tubular legs.

2. The integrated Coriolis mass flow meter of claim 1, wherein the flow sensitive member has a tubular cross section.

3. The integrated Coriolis mass flow meter of claim 2, wherein a thickness of a wall of the flow sensitive member is less than 1 mm.

4. The integrated Coriolis mass flow meter of claim 1, wherein the flow sensitive member is a tubular flow sensitive member.

5. The integrated Coriolis mass flow meter of claim 4, wherein the tubular flow sensitive member is an integral flow sensitive member constructed of a single material.

6. The integrated Coriolis mass flow meter of claim 4, wherein the tubular flow sensitive member has a shape without corners.

7. The integrated Coriolis mass flow meter of claim 4, wherein the tubular flow sensitive member has a shape that is curvilinear.

8. The integrated Coriolis mass flow meter of claim 4, wherein the tubular flow sensitive member is constructed from a polymeric material.

9. The integrated Coriolis mass flow meter of claim 8, wherein the polymeric material is selected from a group consisting of Perfluoroalkoxy alkanes (PFAs), Polyetheretherketone (PEEK), polyvinylidene difluoride (PVDF), Polytetrafluoroethylene (PTFE), and Fluorinated ethylene propylene (FEP).

10. The integrated Coriolis mass flow meter of claim 8, wherein the material for the support is a second polymeric material.

11. The integrated Coriolis mass flow meter of claim 8, wherein the material for the support is glass filled polycarbonate.

12. The integrated Coriolis mass flow meter of claim 1, wherein the support comprises port extensions that clamp the tubular legs.

13. The integrated Coriolis mass flow meter of claim 1, wherein the support has a coefficient of thermal expansion that is substantially equal to or less than a coefficient of thermal expansion of the tubular legs.

14. The integrated Coriolis mass flow meter of claim 1, further comprising:
an additional flow sensitive member, the additional flow sensitive member having additional two tubular legs, wherein all of the tubular legs are parallel, and wherein the support is over-molded over the additional flow sensitive member, wherein all of the tubular legs extend through the support and the support clamps each of the tubular legs.

15. The integrated Coriolis mass flow meter of claim 14, wherein the support comprises isolation plates that establish the boundary conditions of vibration of the flow sensitive members.

16. A method of manufacturing the integrated Coriolis mass flow meter of claim 1, comprising:
closing a mold for the support over the flow sensitive member, the mold positioned to form the support;
injecting a material for the support into the mold, the material injected at a temperature that does not exceed a glass transition temperature of a material for the flow sensitive member;
cooling the injected material; and
releasing the support and flow sensitive member from the mold.

17. The method of claim 16, further comprising:
holding, by a tooling, the flow sensitive member in a fixed position when the material for the support is injected into the mold.

18. The method of claim 16, further comprising:
inserting rods into the tubular legs and maintaining the rods in the tubular legs when the material for the support is injected into the mold and is cooling.

19. The method of claim 16, wherein positioning the mold further comprises closing the mold over an additional flow sensitive member, the additional flow sensitive member having additional two tubular legs, the mold positioned to form the support wherein all of the tubular legs extend through the support, whereby the support is over-molded over all of the flow sensitive members and the support clamps onto all of the tubular legs.

20. An integrated Coriolis mass flow meter, comprising:
a flow sensitive member, the flow sensitive member having two tubular legs; and
a support over-molded over the flow sensitive member, wherein a dampening coefficient of the support is smaller than a dampening coefficient of the tubular legs, each of the tubular legs extends through the support, and the support clamps each of the tubular legs.

21. The integrated Coriolis mass flow meter of claim 20, wherein the flow sensitive member is constructed from a polymeric material and wherein the support has a coefficient of thermal expansion that is substantially equal to or less than a coefficient of thermal expansion of the tubular legs.

* * * * *